(12) United States Patent
Curtis

(10) Patent No.: US 6,932,137 B1
(45) Date of Patent: Aug. 23, 2005

(54) TIRE BEAD BREAKING TOOL

(76) Inventor: John Michael Curtis, R.D. #1, Box 227J, Cowansville, PA (US) 16218

( * ) Notice: Subject to any disclaimer, the term of this patent is extended or adjusted under 35 U.S.C. 154(b) by 19 days.

(21) Appl. No.: 10/746,094

(22) Filed: Dec. 26, 2003

(51) Int. Cl.[7] .......................................... B60C 25/132
(52) U.S. Cl. .................................................. 157/1.17
(58) Field of Search ........................ 157/1.17, 1.3, 157/1.47, 1.49, 11

(56) References Cited

U.S. PATENT DOCUMENTS

| | | | |
|---|---|---|---|
| 2,319,155 A * | 5/1943 | Passanante et al. | 157/1.17 |
| 2,367,638 A * | 1/1945 | McCulloch | 157/1.17 |
| 2,495,117 A * | 1/1950 | McCollister | 157/1.17 |
| 2,619,158 A * | 11/1952 | Kohn | 157/1.17 |
| 2,656,882 A | 10/1953 | Rodgers | |
| 4,462,451 A * | 7/1984 | Ogren | 157/1.17 |
| 4,676,291 A | 6/1987 | Bolger | |
| 4,800,943 A * | 1/1989 | Umemoto et al. | 157/1.17 |
| 5,191,934 A | 3/1993 | Wicklund | |
| 5,555,922 A | 9/1996 | Brunner | |
| 6,276,423 B1 * | 8/2001 | Goracy | 157/1.17 |

FOREIGN PATENT DOCUMENTS

FR 2617442 A1 * 1/1989 ........... B60C 25/02

* cited by examiner

Primary Examiner—David B. Thomas
(74) Attorney, Agent, or Firm—Aileen Champion Addessi

(57) ABSTRACT

A tire bead breaking tool for removing a tire from a tire wheel rim includes an elongated support, which is positionable across the diameter of the tire. First and second clamps are coupled to the elongated support for securing the tire bead breaking tool to the wheel rim. The elongated support is attached to a first and second bracket. A lever arm is removably coupled to the first bracket and provides force against a bead breaker foot, which contacts the tire. The bead breaker foot is positioned at a 10 degree angle and extends between the first and second clamps for facilitating breaking of the bead of the tire. The second clamp is threadedly attached to the tire bead breaking tool for adjustment of the second clamp with respect to the first clamp for using the bead breaking tool for various sized tires.

20 Claims, 4 Drawing Sheets

TIRE BEAD BREAKING TOOL

BACKGROUND OF THE INVENTION

The invention relates to removing a tire from a wheel rim and, more particularly, to a tire bead breaking tool which is transportable and can quickly and efficiently remove the tire from the tire wheel rim.

During car racing, it is common for a tire to be removed from the wheel rim and be replaced with another tire. Since this replacement can occur during a car race, it is necessary for the tire to be quickly and efficiently removed from the wheel rim so that the car driver can quickly return to the track. Also, since the replacement takes place in the pit, the tool used to remove the tire must be transportable.

There are several kinds of tire bead breaking tools. One such device is disclosed in U.S. Pat. No. 4,676,291 to Bolger which discloses a tire bead breaker having a pair of lever arms, and first and second clamps. However, the clamp also acts as the breaker foot, which restricts movement of the breaker foot. Also, the clamp is adjustable only by moving pins, which only allows certain distance adjustments.

U.S. Pat. No. 5,191,934 to Wicklund discloses a portable tire bead breaker having first and second clamps and a bead breaker foot. However, the bead breaker foot uses a power screw to push the tire off the wheel rim.

U.S. Pat. No. 5,555,922 to Brunner discloses a tire bead braking tool having first and second clamps and first and second breaker feet. However, the clamps are adjustable by moving pins.

U.S. Pat. No. 2,656,882 to Rodgers discloses a tire bead breaking tool with a lever arm and an arm for applying pressure to the tire. However, the tool does not use clamps to hold the tool onto the wheel rim.

Therefore, what is needed is an apparatus and method for removing a tire from a wheel rim which utilizes at least two clamps for holding the tool onto the wheel rim, a breaker foot for pushing the tire from the wheel rim, a lever arm for providing the force to break the bead, and adjustment mechanisms for altering the position of both the lever arm and at least one of clamps.

SUMMARY OF THE INVENTION

A bead breaking tool for removing a tire from a wheel rim includes an elongated support having a first end and a second end, the support positionable on the tire. A first bracket is attached to the second end of the support and extends substantially perpendicular to the support. The first bracket has at least one opening and has a plurality of apertures positioned intersecting the opening. A second bracket is attached to the first bracket and to the support and is positioned angularly for supporting the first bracket. The second bracket has at least one slot.

A pin is positioned in each of the plurality of openings of the first bracket. At least one first clamp is attached to the second end of the support, the at least one first clamp securable to the wheel rim. A bead breaker foot is positioned at the second end of the support and slidable within the support for contacting the tire during operation of the bead breaking tool. A second clamp is adjustably coupled to the first end of the support and is securable to the wheel rim.

A lever arm is disposed through the slot of the second bracket and through the opening of the first bracket and is removably engagable with each of the pins, contacts the bead breaker foot, and pushes the bead breaker foot against the tire as the lever arm is moved downwardly for removing the tire from the wheel rim. Preferably, the bead breaker foot is positioned at approximately a 10 degree angle and has a foot which extends beyond the first clamp for positioning at least a portion of the foot between the first and second clamps. The lever arm includes a concave recess having the recess positioned facing upwards for engagement with the plurality of pins during operation of the bead breaker tool.

A method for removing a tire from a wheel rim includes the steps of positioning a tire bead breaking tool on the tire, engaging a first clamp onto the wheel rim, adjusting the position of a second clamp toward or away from the first clamp, and pivoting the second clamp until the second clamp engages the wheel rim. Moving a lever arm downwardly into contact with a bead breaker foot forces the bead breaker foot against the tire. Repositioning of the lever arm at a lower position and moving the lever arm downwardly again into contact with the bead breaker foot for forcing the bead breaker foot against the tire until the tire is removed from the wheel rim.

BRIEF DESCRIPTION OF THE DRAWINGS

While the specification concludes with claims particularly pointing out and distinctly claiming the subject matter of the invention, it is believed the invention will be better understood from the following description, taken in conjunction with the accompanying drawings, wherein:

DESCRIPTION OF THE PREFERRED EMBODIMENT

Figure 1:
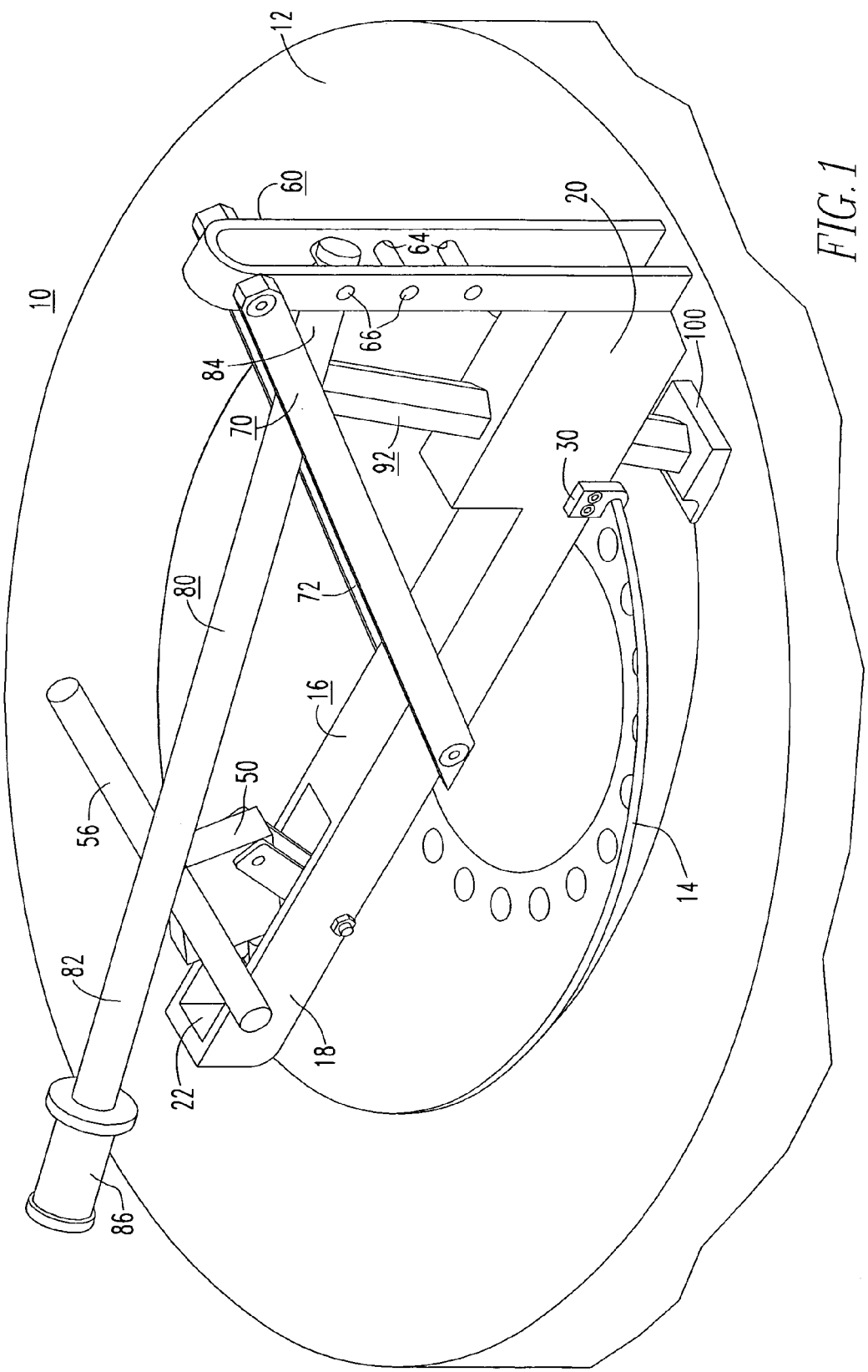
FIG. 1 is an isometric view of a bead breaking tool positioned on a tire.

Referring to FIGS. 1–5, a tire bead breaking tool 10 is positionable on a tire 12 for removing the tire 12 from a wheel rim 14. The tire bead breaking tool 10 includes a support 16 being an elongated member which is sized for positioning across the diameter of the tire 12. The support 16 has a first end 18 and a second end 20. The first end 18 has at least one opening 22. The support 16 may be two pieces of material positioned adjacent to one another and having a space, such as the opening 22 therebetween, may be a solid piece of material having the opening 22 at least partially therethrough, or may be any suitable design for providing support to the tire bead breaking tool 10. The second end 20 of the support 16 may have a bore 24 therethrough, may have a sleeve 26 attached to the support 16 with the bore 24 therethrough, or may have any suitable design for providing a bore through the support 16.

A first clamp 30 is attached to the second end 20 of the support 16. The first clamp 30 is shaped like a hook having a support portion 32, a curved portion 34 and an open portion 36. The clamp 30 is positionable on the wheel rim 14 of the tire 12. Preferably, there are two first clamps 30 in spaced apart relation to one another.

A second clamp 40 is shaped like a hook having a support portion 42, a curved portion 44 and an open portion 46. Alternatively, the first and second clamps 30 and 40 may have any shape which would facilitate engagement with the wheel rim 14. The second clamp 40 is adjustably attached to a support 50. As an example, the second clamp 40 may be threadedly attached to the support 50 by threaded member 52 for adjusting the position of the second clamp 40 with respect to the first clamp 30. Rotation of the second clamp 40 threads the second clamp 40 toward or away from the support 50. An adjustment of the second clamp 40 enables the distance between the first and second clamps to be increased or decreased for fitting the breaking tool 10 on various sized tires 12. As an alternative to the threaded attachment of the second clamp 40 to the support 16, the second clamp 40 may be adjustably coupled to the support 16 by any suitable means.

The support 50 is pivotally attached to the elongated support 16 by at least one pivot arm 54. The support 50 is receivable within the opening 22 of the support 16 for enabling the second clamp 40 to be disposed at least partially through the support 16 for horizontally aligning the first clamp 30 and the second clamp 40. As one example, the support 50 may be block-shaped. A handle 56 is attached to the support 50 for enabling a person to grasp the handle 56 to manipulate the second clamp 40. The cam action of the second clamp 40 provides resistance initially, then allows the second clamp 40 to snap into place. A stop 58 is attached to the support 16 for providing a stopping point for the pivoting clamp 40.

Since both the first and second clamps 30 and 40 are removable, if one the clamps 30 or 40 breaks, the clamp 30 or 40 may be replaced with a new clamp. Also, the clamps 30 or 40 are interchangeable with various sized clamps for providing clamps sized to fit different sized tires. To enhance the securement of the breaker tool 10 to the wheel rim 14, the surface areas of the clamps 30 and 40 that connect to the breaker tool 10 should be precision machined.

A first bracket 60 is attached to the second end 20 of the support 16 and extends substantially perpendicular thereto. The first bracket 60 may be a solid piece of material, may be formed from several pieces of material welded together, or may have any other suitable variation. The first bracket 60 has at least one opening 62 and a plurality of apertures 64 positioned substantially perpendicular to the opening 62 and intersecting the opening 62. A pin 66 is positionable within each of the apertures 64 and extends across the opening 62.

A second bracket 70 is attached to the first bracket 60 and to the support 16 and is positioned angularly therebetween for providing support to the first bracket 60.

The second bracket 70 has at least one slot 72 therethrough. The second bracket 70 may be a solid piece of material having the slot 72 therethrough, may be formed from several pieces of material welded together having the slot 72, or may have any other suitable variation.

A lever arm 80 is disposed through the slot 72 of the second bracket 70 and is slidable therein. The lever arm 80 is an elongated member having a first end 82 and a second end 84. The second end 84 is removably secured to the first bracket 60. The first end 82 has a handle 86 for enabling a person to grasp the handle 86 to manipulate the lever arm 80. The second end 84 has a concave recess 88, which is mateably engagable with the pin 34 positioned in the first bracket 60. A longitudinal axis of the recess 88 extends perpendicular to and intersects a longitudinal axis of the lever arm 80. The recess 88 is positioned on an upper side of the lever arm 80 and faces upwardly, enhancing leverage when the lever arm 80 is in operation. The lever arm 80 may be repositioned on any of the pins 66, thereby allowing the lever arm 80 to be positioned in various locations. On a lower side of the lever arm 80 is a flat surface 90.

A bead breaker foot 92 has an elongated member 94 with a first end 96 and a second end 98. The first end 96 extends through the bore 24 of the support 16 and is slidable therein. The second end 98 is attached to a foot 100. The foot 100 is shaped like a hook, having the opening of the hook extending toward the tire 12. Alternatively, the foot 100 may have any suitable shape which would facilitate engagement with the wheel rim 14. Preferably, the foot 100 is positioned between the two first clamps 30. The foot 100 has an extension portion 102 which extends under the wheel rim 14 and extends beyond the end of the first clamps 30, which positions the extension portion 102 between the first and second clamps 30 and 60. The extension of the foot 100 further toward the second clamp 60 than the first clamp 30 and the positioning of the extension portion 102 between the first and second clamps 30 and 60 enhances the breaking of the bead of the tire 12.

Figure 2:
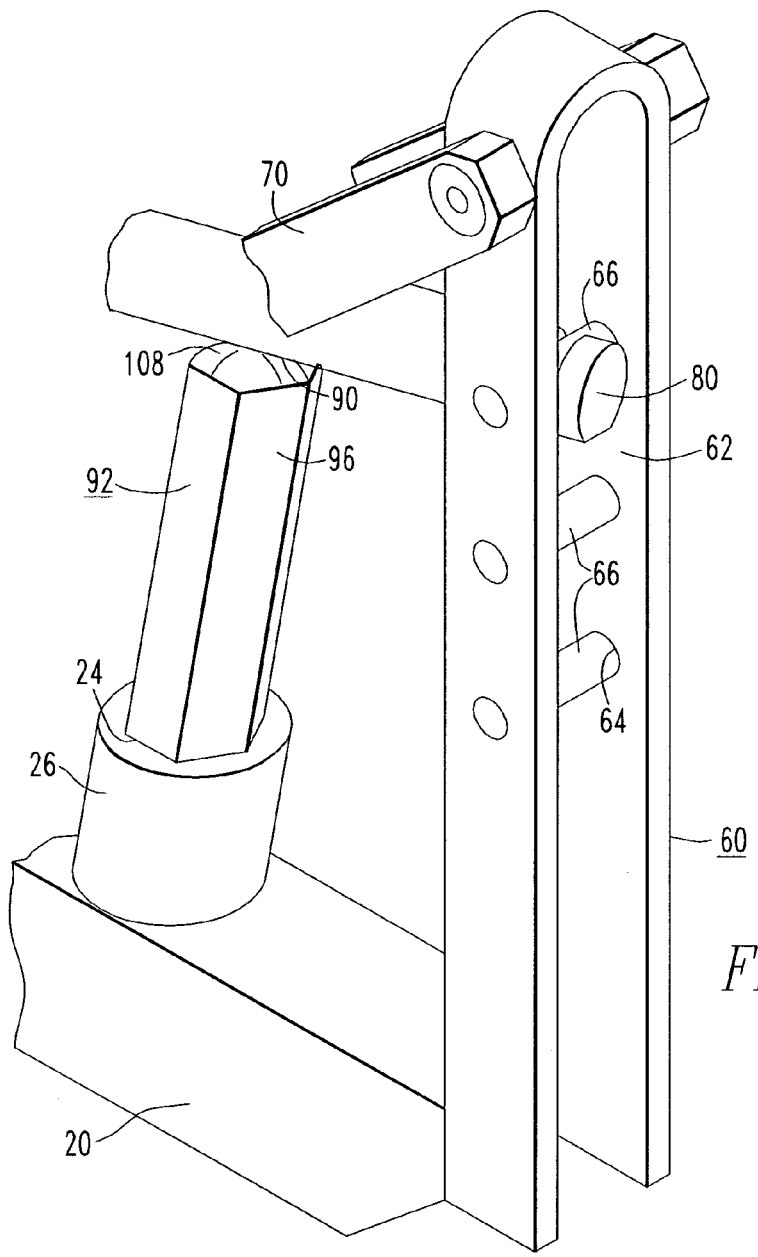
FIG. 2 is a view of a first bracket of the bead breaking tool and alternative embodiment of an elongated support.
Figure 2A:
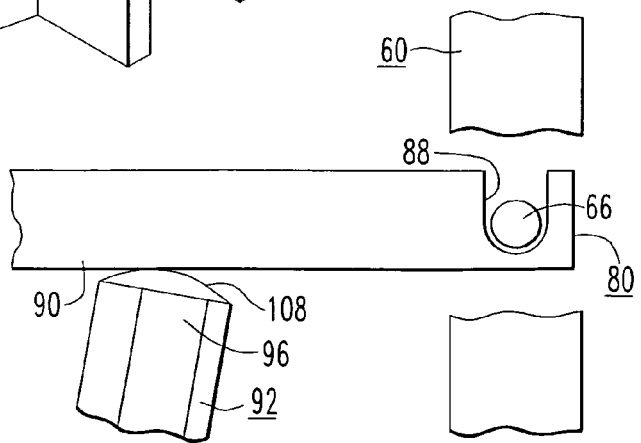
FIG. 2A is a view of a lever arm having a recess.
Figure 3:
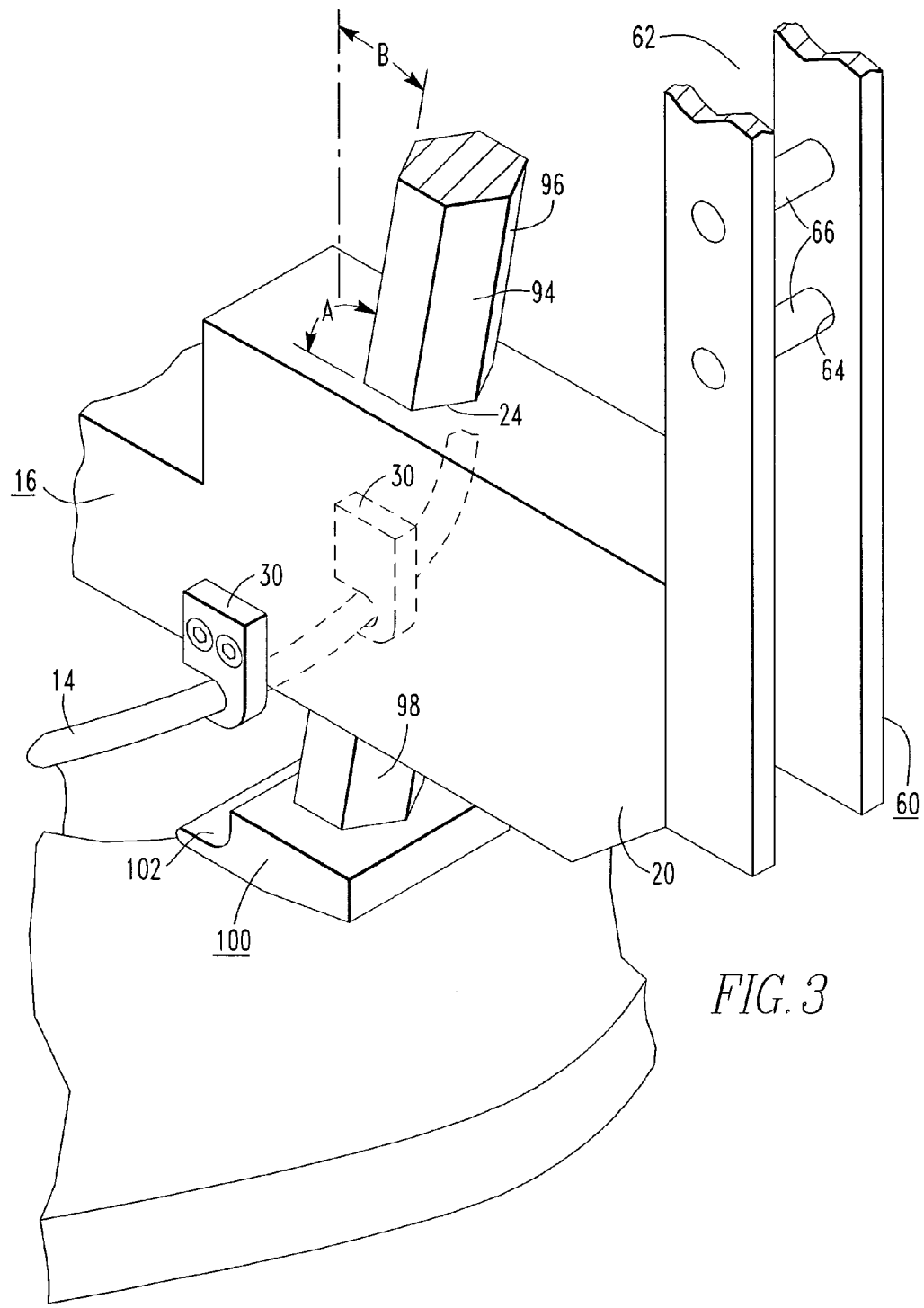
FIG. 3 is a view of a first clamp and a hexagonal shaped bead breaker foot positioned at an angle.
Figure 4:
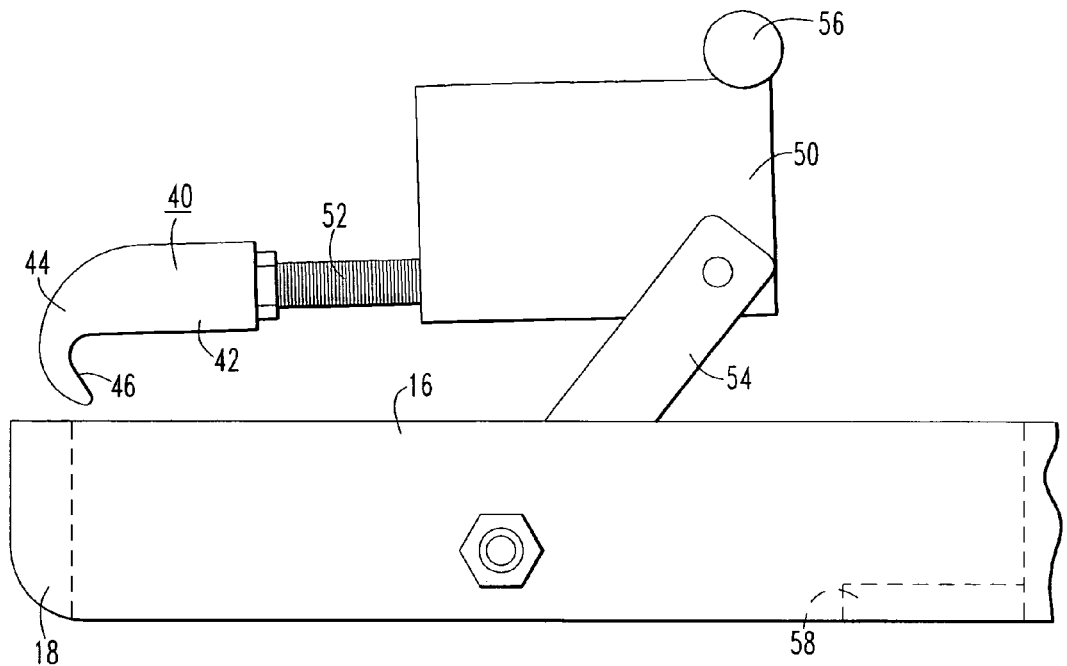
FIG. 4 is a view of a pivoting second clamp.
Figure 5:
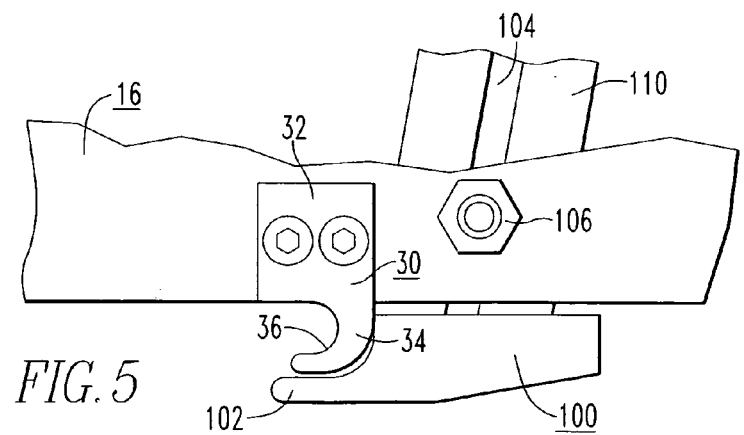
FIG. 5 is a view of a foot of the bead breaking tool extending beyond a first clamp and an alternative embodiment of the hexagonal shape of the bead breaker foot.

To maintain alignment of the bead breaker foot 92 within the support 16 and to prevent the bead breaker foot 92 from rotating, the elongated member 94 may have a hexagonal shaped outside diameter, as illustrated in FIGS. 1–3. The hexagonal shaped elongated member 94 is mateably engagable with the bore 24, which has a hexagonal shaped inside diameter. Alternatively, the inside and outside diameters may have other suitable shape. As illustrated in FIG. 5, another alternative embodiment includes a bead breaker foot 110 having a keyway 104 which extends longitudinally along the elongated member 94 and is mateably engagable with a key 106 coupled to the support 16. Any other means may be used which would maintain alignment of the bead breaker foot 92 or 110 and prevent the bead breaker foot 92 or 110 from rotating.

The elongated member 94 is positioned at an angle A with respect to the elongated support 16. As one example, since a racing wheel rim is positioned at a 10 degree angle, instead of positioning the elongated member 94 perpendicular to the support 16, the elongated member 94 is positioned approximately 10 degrees further than perpendicular, i.e. angle A is 100 degrees and angle B is 10 degrees. The positioning of the breaker foot 92 at an angle substantially the same as the angle of the wheel rim 14 enhances the breaking of the bead of the tire 12 from the wheel rim 14.

The first end 96 of the breaker foot 92 preferably has a rounded end 108. The lever arm 80 is not connected to the breaker foot 92. The flat surface 90 of the lever arm 80 rides on the rounded end 108 of the breaker foot 92. Since the lever arm 80 is not connected to any components of the breaker tool 10, the lever arm 80 is removable. The slotted design of the connection of the lever arm 80 and the pins 34 maintains the lever arm 80 in position.

The tire bead breaking tool 10 may be formed or constructed from aluminum, steel, or any other suitable material.

In operation, the tire bead breaking tool 10 is positioned on the tire 12. The first bracket 60 is hit with a rubber hammer (not shown) to position the first clamp 30 and the breaker foot 92 under the wheel rim 14. Next, the rubber hammer is used to hit the second clamp 40 to position the second clamp 40 under the wheel rim 14 of the tire 12. To lock the second clamp 40 into place, push down on the handle 56, which draws both the first and second clamps 30 and 40 toward one another. The second clamp 40 may be adjusted according to the diameter of the wheel rim 14.

The lever arm 80 is disposed through the opening 62 of the second bracket 70 and the concave recess 88 of the lever arm 80 is engaged with the highest pin 66 in the first bracket 60. The lever arm 80 is lowered until it contacts the rounded end 108 of the bead breaker foot 92. Continue to lower the lever arm 80, which forces the foot 100 against the tire 12.

The lever arm 80 can be pulled out of the bead breaking tool 10 and repositioned on a lower pin 66 in the first bracket 60. The lever arm 80 is again lowered, applying pressure to the bead breaking foot 92, which continues to force the foot 100 against the tire 12. This repositioning and lowering of the lever arm 80 is repeated until the foot 100 breaks the tire bead and allows the tire 12 to be removed from the wheel rim 14.

To remove the tire bead breaking tool 10 from the wheel rim 14, lift the handle 56, which releases the pressure and enables the first and second clamps 30 and 40 to be removed from the rim 14.

An advantage of the tire bead breaking tool 10 is that the use of the adjustable lever arm 80 reduces the amount of force required to be exerted onto the tire 12 to remove the tire 12 from the wheel rim 14. Also, the use of the adjustable lever arm 80 enables the tire 12 to be easily and quickly removed from the wheel rim 14.

Another advantage of the tire bead breaking tool 10 is the use of two first clamps 30 positioned diametrically opposed to the second clamp 40 which provides a three point contact on the wheel rim 14. The three point contact provides a more secure attachment of the tire bead breaking tool 10 on the wheel rim 14. A more secure attachment makes it easier to break the tire bead.

Another advantage of the tire bead breaking tool 10 is the use of a design, such as a hexagonal shaped bead breaker foot 92 and bore 24, a cylindrical shaped bead breaker foot 110 having the key 106 and keyway 104, or any other suitable design for maintaining alignment and positioning the bead breaker foot 92. The precise positioning of the foot 92 enhances the efficient removal of the tire 12 from the wheel rim 14.

Yet another advantage of the tire bead breaking tool 10 is the positioning of the bead breaking tool 10 at a 10 degree angle from perpendicular. This positions the foot 100 at a preferable angle for providing better contact between the foot 100 and the tire 12.

Yet another advantage of the tire bead breaking tool 10 is the extension of the foot 100 between the first and second clamps 30 and 40, which also provides a better contact between the foot 100 and the tire 12.

Another advantage of the tire bead breaking tool 10 is that the lever arm 80 is removable and repositionable, which provides varying degrees of leverage for applying pressure to the bead breaker foot 92. Also, the slotted design of the lever arm 80, which mateably engages with the pin 66, maintains positioning of the lever arm 80 and improves the leverage. Additionally, the lever arm 80 is not attached to the breaker foot 92, but has the flat surface 90, which rides on the rounded end 108 of the breaker foot 92.

Another advantage is that the first and second clamps 30 and 60 are replaceable and interchangeable for enabling broken clamps to be replaced and for fitting different sized tires.

Thus there has been shown and described a novel tire bead breaking tool and method which fulfills all the objects and advantages sought therefor. Many changes, modifications, variations and other uses and applications of the subject invention will, however, become apparent to those skilled in the art after considering this specification together with the accompanying drawings and claims. All such changes, modifications, variations and other uses and applications which do not depart from the spirit and scope of the invention are deemed to be covered by the invention which is limited only by the claims which follow.

I claim:

1. A tire bead breaker tool for removing a tire from a tire rim, comprising:
    an elongated support having a first end and a second end, the elongated support positionable on the tire;
    at least one first clamp attached to the second end of the elongated support;
    a second clamp coupled to the first end of the elongated support and adjustable for adjusting the distance between the first and second clamps for enabling the first and second clamps to be positioned on the wheel rim;
    a bead breaker foot slidably coupled to the second end of the support, the bead breaker foot contacting the tire during operation of the tire bead breaker tool; and
    a lever arm coupled to the bead breaker foot for slidably moving the bead breaker foot into contact with the tire and for applying force to the bead breaker foot for removing the tire from the wheel rim.

2. The tool according to claim 1, wherein the at least one first clamp includes a pair of first clamps positioned adjacent to and in spaced apart relation to one another for enabling the bead breaker foot to be positioned between the two first clamps for providing a three point contact of the first and second clamps on the wheel rim.

3. The tool according to claim 1, wherein the bead breaker foot is positioned at an angle.

4. The tool according to claim 1, further comprising:
    the bead breaker foot including an elongated member having a hexagonal shaped outside diameter; and
    the elongated support having a bore with a hexagonal shaped inside diameter for mateably and slidably receiving the bead breaker foot within the bore for maintaining positioning of the bead breaker foot.

5. The tool according to claim 1, wherein the bead breaker foot has a rounded end for contact with the lever arm during operation of the bead breaker tool.

6. The tool according to claim 1, wherein the bead breaker foot includes a foot having an extension portion, the foot extending beyond the first clamp for positioning at least a portion of the foot between the first and second clamps, which positions the extension portion of the foot closer to the second clamp than the positioning of the first clamp with respect to the second clamp.

7. The tool according to claim 1, further comprising:
    at least one pivot arm pivotally attached to the elongated support;
    a pivoting support pivotally attached to the at least one pivot arm; and
    the second clamp attached to the pivoting support for pivotally coupling the second clamp to the elongated support.

8. The tool according to claim 1, further comprising:
    a threaded support coupled to the elongated support and having a threaded hole at least partially therethrough; and
    a threaded member attached to the second clamp and threadedly receivable in the threaded hole of the threaded support for adjusting positioning of the second clamp.

9. The tool according to claim 7, further comprising a stop attached to the elongated support and positioned between the first and second clamps for providing a stopping point for the pivoting threaded member.

10. The tool according to claim 1, further comprising:
a first bracket attached to the second end of the support and extending substantially perpendicular to the elongated support, the first bracket having at least one opening and having a plurality of apertures positioned intersecting the at least one opening;
a second bracket attached to the first bracket and to the support and positioned angularly for supporting the first bracket, the second bracket having at least one slot;
a pin positioned in each of the plurality of apertures of the first bracket; and
the lever arm disposable through the slot of the second bracket and through the opening of the first bracket for engagement with one of the plurality of pins.

11. The tool according to claim 10, wherein the lever arm includes a concave recess having the recess positioned facing upwards, the recess engagable with the plurality of pins during operation of the bead breaker tool.

12. The tool according to claim 1, wherein the lever arm includes a flat surface contactable with the bead breaker foot during operation of the bead breaker tool.

13. The tool according to claim 1, wherein the first and second clamps include a support portion, a curved portion and an open portion, the open portions of the first and second clamps facing one another, the curved portion engagable with the wheel rim for securing the bead breaker tool onto the wheel rim.

14. A bead breaking tool for removing a tire from a wheel rim, comprising:
an elongated support having a first end and a second end, the elongated support positionable on the tire;
a first bracket attached to the second end of the support and extending substantially perpendicular to the elongated support, the first bracket having at least one opening and having a plurality of apertures positioned intersecting the at least one opening;
a second bracket attached to the first bracket and to the elongated support and positioned angularly for supporting the first bracket, the second bracket having at least one slot;
a pin positioned in each of the plurality of apertures of the first bracket;
at least one first clamp attached to the second end of the support, the at least one first clamp securable to the wheel rim;
a bead breaker foot positioned at the second end of the elongated support and slidable within the support for contacting the tire during operation of the bead breaking tool;
a second clamp adjustably coupled to the first end of the support, the second clamp securable to the wheel rim; and
a lever arm disposed through the slot of the second bracket, through the opening of the first bracket and removably engagable with each pin, the lever arm contacting the bead breaker foot and pushing the bead breaker foot against the tire as the lever arm is moved downwardly for removing the tire from the wheel rim.

15. The tool according to claim 14, wherein the bead breaker foot is positioned at approximately a 10 degree angle.

16. The tool according to claim 14, wherein the bead breaker foot has a foot which extends beyond the first clamp for positioning at least a portion of the foot between the first and second clamps.

17. The tool according to claim 14, wherein the lever arm includes a concave recess having the recess positioned facing upwards, the recess engagable with the plurality of pins during operation of the bead breaker tool.

18. The tool according to claim 14, further comprising:
at least one pivot arm pivotally attached to the elongated support;
a threaded support pivotally attached to the at least one pivot arm and having a threaded hole at least partially therethrough;
a threaded member attached to the second clamp and threadedly receivable in the threaded hole of the threaded support for adjusting positioning of the second clamp; and
a handle attached to the threaded support for enabling a person to grasp the handle to manipulate the second clamp.

19. The tool according to claim 14, wherein:
the bead breaker foot has a rounded end for contact with the lever arm during operation of the bead breaker tool; and
the lever arm has a flat surface contactable with the rounded end of the bead breaker foot during operation of the bead breaker tool.

20. A method for removing a tire from a wheel rim, comprising the steps of:
positioning a tire bead breaking tool on the tire;
engaging a first clamp onto the wheel rim;
adjusting the position of a second clamp toward or away from the first clamp;
engaging the second clamp until the second clamp engages the wheel rim;
moving a lever arm downwardly into contact with a bead breaker foot forcing the bead breaker foot against the tire; and
repositioning the lever arm at a lower position and moving the lever arm downwardly again into contact with the bead breaker foot for forcing the bead breaker foot against the tire until the tire is removed from the wheel rim.

* * * * *